(12) United States Patent
Jacobsen et al.

(10) Patent No.: US 7,273,912 B2
(45) Date of Patent: *Sep. 25, 2007

(54) SUPPORTED OLEFIN POLYMERIZATION CATALYST

(75) Inventors: Grant Berent Jacobsen, Bouc-Bel-Air (FR); Brian Stephen Kimberley, Bouche du Rhone (FR); Claudine Viviane Lalanne-Magne, Saint Mitre les Remparts (FR); Sergio Mastroianni, Martigues (FR)

(73) Assignee: Innovene Europe Limited, Middlesex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/539,518

(22) PCT Filed: Dec. 3, 2003

(86) PCT No.: PCT/GB03/05208

§ 371 (c)(1),
(2), (4) Date: Jun. 17, 2005

(87) PCT Pub. No.: WO2004/055063

PCT Pub. Date: Jul. 1, 2004

(65) Prior Publication Data

US 2006/0100091 A1  May 11, 2006

(30) Foreign Application Priority Data

Dec. 17, 2002  (EP) .................................. 02358029

(51) Int. Cl.
*C08F 4/78* (2006.01)
*B01J 27/053* (2006.01)

(52) U.S. Cl. ...................... 526/169; 526/160; 526/170; 526/161; 526/172; 526/134; 526/348; 502/219; 502/217; 502/103

(58) Field of Classification Search ................ 502/122, 502/103, 217, 219; 526/169, 160, 150, 943, 526/730, 172, 161, 134
See application file for complete search history.

(56) References Cited

U.S. PATENT DOCUMENTS

| 4,139,491 A | * | 2/1979 | Dorawala et al. | 502/439 |
| 5,036,035 A | * | 7/1991 | Baba et al. | 502/221 |
| 5,182,247 A | * | 1/1993 | Kuhlmann et al. | 502/217 |
| 5,883,036 A | * | 3/1999 | Fujie et al. | 502/217 |
| 6,107,230 A | * | 8/2000 | McDaniel et al. | 502/104 |
| 6,235,918 B1 | * | 5/2001 | Marks et al. | 556/53 |
| 6,300,271 B1 | * | 10/2001 | McDaniel et al. | 502/104 |
| 6,632,911 B1 | * | 10/2003 | Takahashi et al. | 526/348.1 |
| 6,677,411 B2 | * | 1/2004 | Uchino et al. | 526/127 |
| 6,734,266 B2 | * | 5/2004 | Gao et al. | 526/129 |
| 6,831,141 B2 | * | 12/2004 | McDaniel et al. | 526/129 |
| 2002/0007023 A1 | | 1/2002 | McDaniel et al. | |

FOREIGN PATENT DOCUMENTS

| EP | 1 097 949 A1 | 5/2001 |
| EP | 1 241 188 A1 | 9/2002 |
| WO | WO 02/066524 A1 | 8/2002 |

OTHER PUBLICATIONS

Ahn et al. Organometallics 2002, 21, 1788-1806.*

* cited by examiner

*Primary Examiner*—David W. Wu
*Assistant Examiner*—Rip A. Lee
(74) *Attorney, Agent, or Firm*—Finnegan, Henderson, Farabow, Garrett and Dunner, L.L.P.

(57) ABSTRACT

Supported catalyst systems are provided comprising (a) a transition metal compound, (b) a non aluminoxane activator comprising, and (c) a support material comprising an inorganic metal oxide, inorganic metal halide or polymeric material or mixtures thereof characterised in that the support material has been pretreated with an $SO_4$ containing compound. The preferred transition metal compounds are metallocenes and the $SO_4$ containing compound is typically sulphuric acid. The supported catalyst systems show improved activity and also may reduce fouling in gas phase fluidised bed processes.

27 Claims, No Drawings

SUPPORTED OLEFIN POLYMERIZATION CATALYST

The present invention relates to supported catalysts and in particular to supported catalysts for use in the gas phase (co-) polymerisation of olefins in a fluidised bed reactor.

Processes for the co-polymerisation of olefins in the gas phase are well known in the art. Such processes can be conducted for example by introducing the gaseous monomer and comonomer into a stirred and/or gas fluidised bed comprising polyolefin and a catalyst for the polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed commences to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the beat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidised the bed, and to maintain the bed at the desired temperature. Monomers consumed by the polymerisation reaction are normally replaced by adding make up gas or liquid to the polymerisation zone or reaction loop.

It is also well known that fouling in gas phase polymerisation process can be a major problem, and can be caused by non-uniform fluidisation as well as poor heat transfer in the polymerisation process. Catalyst and polymer particles may adhere together or to the walls of the reactor and continue to polymerise, and often fuse together and form chunks, which can be detrimental to a continuous process, particularly a fluidised bed process The incorporation of antistatic agents in polymerisation catalysts is well known. For example U.S. Pat. No. 5,414,064 describes the use of Stadis with chromium based catalysts while U.S. Pat. No. 5,498,581 describes again the use of Stadis with silica supported metallocene catalyst systems.

U.S. Pat. No. 6,469,111 describes the gas phase polymerisation of olefins using a catalyst system containing an antistatic agent based on magnesium oxide or zinc oxide. The oxides are used in a mixture with a supported polymerisation catalyst component. The catalyst systems described therein include supported chromium oxide catalysts and also supported metallocene complexes in particular bis(cyclopentadienyl) metallocene complexes.

More recently WO 02/066524 describes supported catalysts for olefin polymerisation comprising a combination of a sulfated metal oxide support and an aluminoxane. The sulphated metal oxide support may be easily prepared by contacting a precursor metal oxide with a material having a $SO_4$ group such as sulphuric acid or ammonium sulphate. Typically the resultant aluninoxane deposited on the sulphated metal oxide is used with an organometallic complex of a Group 4 metal, in particular with metallocene complexes comprising both a cyclopentadienyl ligand and a phosphinimine ligand. The catalyst systems reported therein exhibit improved activity.

We have now surprisingly found that the pretreatment of support materials with certain sulphate compounds leads to supports which when used with non-aluminoxane activators for the gas phase (co-) polymerisation of olefins in a fluidised bed reactor may lead to a reduction in static levels on the resultant polymers thereby reducing fouling.

Thus according to the present invention there is provided a supported catalyst system suitable for the polymerisation of olefins comprising:

(a) a transition metal compound,
(b) a non-aluminoxane activator, and
(c) a support material comprising an inorganic metal oxide, inorganic metal halide or polymeric material or mixtures thereof characterised in that the support material has been pretreated with an $SO_4$ containing compound.

Suitable $SO_4$ containing compounds include both metal and non-metal sulphates.

Preferred metal sulphates are transition metal sulphates for example sulphates of iron, copper, zinc, nickel and cobalt. Particularly preferred are sulphates of iron and copper.

Preferred non-metal sulphates are ammonium sulphates.

Sulphuric acid is also particularly suitable for use in the present invention.

The most preferred support material for use with the supported catalysts according to the present invention are inorganic oxides in particular oxides of aluminium, silicon, zirconium, zinc and titanium. Alumina, silica and silica-alumina are preferred metal oxides. Suitable silicas include Crosfield ES70, Davison 948 and Sylopol 948 silicas.

The support material is preferably treated with a water solution of the required inorganic metal salt.

The support material may then be further subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The support material may be further combined with an organometallic compound preferably an organoaluminium compound and most preferably a trialkylaluminium compound in a dilute solvent.

The support material may be combined with more than one organometallic compounds for example a combination of triethylaluminum and triusobutylaluminium may be used.

The support material is pretreated with the organometallic compound at a temperature of −20° C. to 150° C. and preferably at 20° C. to 100° C.

The transition metal compound according to the present invention may suitably compound used in conjunction with a porous support in the present of a suitable cocatalyst.

The transition metal compound may be a compound of Groups IIIA to IIB of the Periodic Table of Elements (IUPAC Version). Examples of such transition metal compounds are traditional Ziegler Natta, vanadium and Phillips-type catalysts well known in the art.

The traditional Ziegler Natta catalysts include transition metal compounds from Groups IVA-VIA, in particular catalysts based on titanium compounds of formula MRx where M is titanium and R is halogen or a hydrocarbyloxy group and x is the oxidation state of the metal. Such conventional type catalysts include $TiCl_4$, $TiBr_4$, $Ti(OEt)_3Cl$, $Ti(OEt)_2Br_2$ and similar. Traditional Ziegler Natta catalysts are described in more detail in "Ziegler-Natta Catalysts and Polymerisation" by J.Boor, Academic Press, New York, 1979.

Vanadium based catalysts include vanadyl halides eg. $VCl_4$, and alkoxy halides and alkoxides such as $VOCl_3$, $VOCl_2(OBu)$, $VCl_3(OBu)$ and similar.

Conventional chromium catalyst compounds referred to as Phillips type catalysts include $CrO_3$, chromocene, silyl chromate and similar and are described in U.S. Pat. No. 4,124,532, U.S. Pat. No. 4,302,565.

Other conventional transition metal compounds are those based on magnesium/titanium electron donor complexes described for example in U.S. Pat. No. 4,302,565.

Other suitable transition metal compounds are those based on the late transition metals (LTM) of Group VIII for example compounds containing iron, nickel, manganese, ruthenium, cobalt or palladium metals. Examples of such compounds are described in WO 98/27124 and WO 99/12981 and may be illustrated by [2,6-diacetylpyridinebis(2,6-diisopropylanil)$FeCl_2$], 2,6-diacetylpyridinebis(2,4,6-trimethylanil) $FeCl_2$ and [2,6-diacetylpyridinebis(2,6-diisopropylanil)$COCl_2$].

Other transition metal compounds include derivatives of Group IIIA, IVA or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is selected from Group IVB of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1, 471-480 (1995).

The preferred polymerisation catalyst of the present invention is a bulky ligand compound also referred to as a metallocene complex containing at least one of the aforementioned delocalized π-bonded group, in particular cyclopentadienyl ligands. Such metallocene complexes are those based on Group IVA metals for example titanium, zirconium and hafnium.

Metallocene complexes may be represented by the general formula:

LxMQn where L is a cyclopentadienyl ligand, M is a Group IVA metal, Q is a leavning group and x and n are dependent upon the oxidation state of the metal.

Typically the Group IVA metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged eg. bis(cyclopentadienyl) zirconium dichloride, bis(pentamethyl)cyclopentadienyl dichloride, or may be bridged eg. ethylene bis(indenyl) zirconium dichloride or dimethylsilyl(indenyl) zirconium dichloride.

Other suitable bis(cyclopentadienyl) metallocene complexes are those bis(cyclopentadienyl) diene complexes described in WO 96/04290. Examples of such complexes are bis(cyclopentadienyl) zirconium (2,3-dimethyl-1,3-butadiene) and ethylene bis(indenyl) zirconium 1,4-diphenyl butadiene.

Examples of monocyclopentadienyl or substituted monocyclopentadienyl complexes suitable for use in the present invention are described in EP 416815, EP 418044, EP 420436 and EP 551277. Suitable complexes may be represented by the general formula:

$CpMX_n$ wherein Cp is a single cyclopentadienyl or substituted cyclopentadienyl group optionally covalently bonded to M through a substituent, M is a Group VIA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

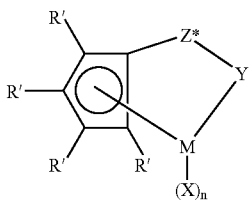

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido) dimethyl (tetramethyl-$\eta^5$-cyclopentadienyl)silanetitanium dichloride and (2-methoxyphenylamido) dimethyl(tetramethyl-$\eta^5$-cyclopentadienyl)silanetitanium dichloride.

Other suitable monocyclopentadienyl complexes are those comprising phosphinimine ligands described in WO 99/40125, WO 00/05237, WO 00/05238 and WO00/32653. A typical examples of such a complex is cyclopentadienyl titanium[tri (tertiary butyl)phosphinimine]dichloride.

Another type of polymerisation catalyst suitable for use in the present invention are monocyclopentadienyl complexes comprising heteroallyl moieties such as zirconium (cyclopentadienyl) tris (diethylcarbamates) as described in U.S. Pat. No. 5,527,752 and WO 99/61486.

Particularly preferred metallocene complexes for use in the preparation of the supported catalysts of the present invention may be represented by the general formula:

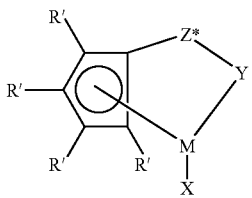

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is SiR*$_2$, CR*$_2$, SiR*$_2$SiR*$_2$, CR*$_2$CR*$_2$, CR*=CR*, CR*$_2$SiR*$_2$, or

GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is $C_{1-10}$ hydrocarbyl.

Most preferred complexes are amidosilane—or amidoalkanediyl complexes.

Most preferred complexes are those wherein M is titanium.

Specific complexes suitable for use in the preparation of the supported catalysts of the present invention are those disclosed in WO 95/00526 and are incorporated herein by reference.

A particularly preferred complex for use in the preparation of the supported catalysts of the present invention is (t-butylamido) (tetramethyl-$\eta^5$-cyclopentadienyl)dimethyl silanetitanium-$\eta^4$-1,3-pentadiene.

The non-aluminoxane activator component may be chosen from a wide range of compounds well known in the art for the activation of transition metal compounds.

A preferred type of activator are organoboron compounds.

Preferred organoboron compounds are triarylboron compounds, in particular perfluorinated triarylboron compounds.

The most preferred organoboron compound is tris(pentafluorophenyl)borane (FAB).

Other compounds suitable as activators are compounds which comprise a cation and an anion. The cation is typically a Bronsted acid capable of donating a proton and the anion is typically a compatible non-coordinating bulky species capable of stabilizing the cation.

Such activators may be represented by the formula:

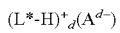

wherein
L* is a neutral Lewis base
$(L^*-H)^+_d$ is a Bronsted acid
$A^{d-}$ is a non-coordinating compatible anion having a charge of d−, and
d is an integer from 1 to 3.

The cation of the ionic compound may be selected from the group consisting of acidic cations, carbonium cations, silylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic compounds used as activators are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate.

The most preferred activators of this type are those wherein the anion comprises a boron atom.

A preferred type of activator suitable for use with the metallocene complexes of the present invention comprise ionic compounds comprising a cation and an anion wherein the anion has at least one substituent comprising a moiety having an active hydrogen.

Suitable activators of this type are described in WO 98/27119 the relevant portions of which are incorporated herein by reference.

Examples of this type of anion include:
triphenyl(hydroxyphenyl)borate
tri(p-tolyl)(hydroxyphenyl)borate
tris(pentafluorophenyl)(hydroxyphenyl)borate
tris(pentafluorophenyl)(4-hydroxyphenyl)borate Examples of suitable cations for this type of activator include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogentated tallow alkyl)methylammonium and similar.

Particular preferred activators of this type are alkylammonium tris(pentafluorophenyl) 4-(hydroxyphenyl)borates. A particularly preferred cocatalyst is bis(hydrogenated tallow alkyl)methyl ammonium tris(pentafluorophenyl)(4-hydroxyphenyl)borate.

With respect to this type of activator, a preferred compound is the reaction product of an alkylammonium tris (pentaflurophenyl)-4-(hydroxyphenyl)borate and an organometallic compound, for example triethylaluminium.

The supported catalyst systems of the present invention are most suitable for operation in processes which typically employ supported polymerisation catalysts.

The supported catalysts of the present invention may be suitable for the polymerisation of olefin monomers selected from (a) ethylene, (b) propylene (c) mixtures of ethylene and propylene and (d) mixtures of (a), (b) or (c) with one or more other alpha-olefins.

Thus according to another aspect of the present invention there is provided a process for the polymerisation of olefin monomers selected from (a) ethylene, (b) propylene (c) mixtures of ethylene and propylene and (d) mixtures of (a), (b) or (c) with one or more other alpha-olefins, said process performed in the presence of a supported catalyst system as hereinbefore described.

The supported catalyst systems of the present invention are however most suitable for use in slurry or gas phase processes.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and α-olefins having from 3 to 10 carbon atoms.

Thus according to another aspect of the present invention there is provided a process for the polymerisation of ethylene or the copolymerisation of ethylene and α-olefins having from 3 to 10 carbon atoms, said process performed under polymerisation conditions in the present of a supported catalyst system as hereinbefore described.

The preferred α-olefins are 1-butene, 1-hexene, 4-methyl-1-pentene and 1-octene.

The supported catalysts prepared according to the present invention may also be suitable for the preparation of other polymers for example polypropylene, polystyrene, etc.

The supported catalyst system of the present invention may advantageously be used in a polymerisation process for the reduction or prevention of electrostatic charging.

When used for the polymerisation of olefins in a gas phase process the supported catalyst systems of the present invention reduce static levels on the resultant polymers thereby preventing the formation of deposits on the reactor walls and reducing fouling in the reactor. This is particularly the case for processes performed in a fluidised bed reactor and in particular for the copolymerisation of ethylene and alpha-olefins.

Thus according to another aspect of the present invention there is provided a method for reducing the static charge on polymers prepared by a gas phase polymerisation of olefins in a fluidised bed reactor wherein said polymerisation is carried out in the presence of a supported catalyst system as hereinbefore described.

The present invention will now be further illustrated by reference to the following examples:

Abbreviations
TEA triethylaluminium
TiBAL triisobutylaluminium

Ionic Activator A [N(H)Me(C$_{18}$H$_{37}$)$_2$][B(C$_6$F$_5$)$_3$(p-OHC$_6$H$_4$)]
Complex A (C$_5$Me$_4$SiMe$_2$N$^t$Bu)Ti($\eta^4$-1,3-pentadiene)

EXAMPLE 1

Preparation of Modified Silicas

A sulphuric acid modified silica (A) was prepared as follows: to 25 g silica Sylopol 948 dispersed in 125 ml of water was added dropwise 7.06 g of sulphuric acid. The solvent was then removed by beating at 115° C. overnight. The silica was then calcined under nitrogen at 250° C. for 5 h For comparison, 20 g silica Sylopol 948 was calcined under nitrogen at 250° C. for 5 hours to give Silica (B)

Catalyst Preparation

EXAMPLE 2

To a suspension of 10 g of silica (A) (as described above) in hexane (50 ml) was added 7.4 ml of TEA (solution in hexane, [Al]=1.027 mol/l) and 8.4 ml of TiBAl (solution in hexane, 0.952 mol/l). The mixture was allowed to react for 30 minutes then the liquid fraction was filtered and the remaining solid was washed with 3×20 ml of hexane and finally dried under vacuum.

[Al]=1.35 mmol/g

To 1.485 ml of a toluene solution (11.1 wt %) of Ionic Activator A was added 0.252 ml of a toluene solution of TEA ([Al]=0.25 mol/l). This solution was the added to 4 g of the above prepared silica/(TEA+TiBAl) and the mixture was well agitated until non lumps were visible and was allowed to stand for 30 min. 0.705 ml of an heptane solution of Complex A (9.17% wt) was then impregnated. The mixture was well agitated until non lumps were visible and was allowed to stand for 30 min 10.42 ml of hexane were then added then the liquid fraction was filtered and the remaining solid was washed with 3×20 ml of hexane and finally dried under vacuum.

[Al]=1.28 mmol/g

[Ti]=31 µmol/g

EXAMPLE 3 (COMPARATIVE)

To a suspension of 5.404 g of silica (B) (as described above) in hexane (30 ml) was added 10 ml of TEA (solution in hexane, [Al]=1.047 mol/l). The mixture was allowed to react for 30 minutes then the liquid fraction was filtered and the remaining solid was washed with 3×20 ml of hexane and finally dried under vacuum.

[Al]=1.54 mmol/g

To 1.485 ml of a toluene solution (11.1 wt %) of Ionic Activator A was added 0.252 ml of a toluene solution of TEA ([Al]=0.25 mol/l). This solution was the added to 4 g of the above prepared silica/TEA and the mixture was well agitated until non lumps were visible and was allowed to stand for 30 min. 0.705 ml of an heptane solution of Complex A (9.17% wt) was then impregnated. The mixture was well agitated until non lumps were visible and was allowed to stand for 30 min 10.42 ml of hexane were then added then the liquid fraction was filtered and the remaining solid was washed with 3×20 ml of hexane and finally dried under vacuum.

[Al]=1.43 mmol/g

[Ti]=37.5 µmol/g

Polymerisation Data

Gas Phase Polymerizations

The following gas phase polymerisations were carried using the above supported catalyst compositions using the following procedure:

A 2.5 l double jacketed thermostatic stainless steel autoclave was purged with nitrogen at 70° C. for at least one hour. 150 g of PE pellets previously dried under vacuum at 80° C. for 12 hours were introduced and the reactor was then purged three times with nitrogen (7 bar to atmospheric pressure). ~0.13 g of TEA treated silica (1.5 mmol TEA/g) was added under pressure and allowed to scavenge impurities for at least 15 minutes under agitation. The gas phase was then composed (addition of ethylene, 1-hexene and hydrogen) and a mixture of supported catalyst (~0.1 g) and silica/TEA (~0.1 g) was injected. A constant pressure of ethylene and a constant pressure ratio of ethylene/co-monomer were maintained during the run. The run was terminated by venting the reactor and then purging the reactor 3 times with nitrogen. The PE powder produced during the run was then separated from the PE seed bed by simple sieving.

| Run | Catalyst | Agitation speed (rev/min) | Ethylene (bar) | 1-Hexene (ppm) | Hydrogen (ml) | Catalyst (g) | Time (hrs) |
|---|---|---|---|---|---|---|---|
| 1 | Example 2 | 100 | 6.5 | 6500 | 50 | 0.098 | 1.17 |
| 2 | Example 3 Comparative | 100 | 6.5 | 6300 | 40 | 0.100 | 1 |

The activities and the product characteristics are shown below. Electrostatic charges was measured under same conditions using a Valitec Electrastatic sensor on the polyethylene powder when downloaded from the reactor.

| Run° | Activity (g/mmol · h · bar) | Melt Index (2.16 kg) g/10 min | Density (g/ml) | Electrostatic charge (KV/inch) |
|---|---|---|---|---|
| 1 | 1830 | 1.5 | 0.921 | −0.4 |
| 2 | 2520 | 1 | 0.927 | −2 |

Polymer made using a catalyst based on sulphuric acid modified silica clearly shows lower static charge than the reference example.

The invention claimed is:

1. A supported catalyst system suitable for the polymerisation of olefins comprising
   (a) metallocene having the formula:

CpMX$_n$ wherein Cp is a single cyclopentadienyl or substituted cyclopentadienyl group optionally covalently bonded to M through a substituent, M is a Group VIA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, and siloxyalkyl having up to 20 non-hydrogen atoms or neutral Lewis base ligands having up to 20 non-hydrogen atoms or optionally one X together with Cp forms a metallocycle with M and n is dependent upon the valency of the metal, (b) a non-aluminoxane activator, and (c) a support material comprising an inorganic metal oxide, inorganic metal halide or polymeric material or mixtures thereof, wherein the support material has been pretreated with an $SO_4$ containing compound.

2. A supported catalyst system according to claim 1 wherein the support material is silica.

3. A supported catalyst system according to claim 1 wherein the metallocene is represented by the general formula:

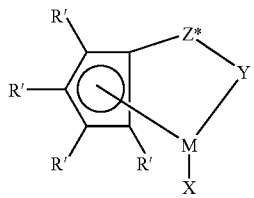

wherein:
- R' each occurrence is independently selected from hydrogen, hydrocarbyl, silyl, germyl, halo, cyano, or combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
- X is a neutral $\eta^4$ bonded diene group having up to 30 non-hydrogen atoms, which forms a π-complex with M;
- Y is —O—, —S—, —NR*—, —PR*—,
- M is titanium or zirconium in the +2 formal oxidation state;
- Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein:
- R* each occurrence is independently hydrogen, or a member selected from hydrocarbyl, silyl, halogenated alkyl, halogenated aryl, or combinations thereof, said R* having up to 10 non-hydrogen atoms, and optionally, two R* groups from Z* (when R* is not hydrogen), or an R* group from Z* and an R* group from Y form a ring system.

4. A supported catalyst system according to claim 1 or 2 wherein the activator is represented by the formula:

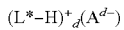

wherein
- L* is a neutral Lewis base
- $(L^*-H)^+_d$ is a Bronsted acid
- $A^{d-}$ is a non-coordinating compatible anion of a Group IIIA metal or metalloid having a charge of d⁻, and
- d is an integer from 1 to 3.

5. A supported catalyst composition according to claim 4 wherein the anion comprises a boron metal.

6. A supported catalyst system according to claim 4 wherein the activator comprises a cation and an anion wherein the anion has at least one substituent comprising a moiety having an active hydrogen.

7. A supported catalyst system according to claim 1 wherein the $SO_4$ containing compound is a transition metal sulphate.

8. A supported catalyst system according to claim 7 wherein the transition metal sulphate is a sulphate of iron or copper.

9. A supported catalyst system according to claim 1 wherein the $SO_4$ containing compound is ammonium sulphate or sulphuric acid.

10. A process for the polymerisation of olefin monomer(s) selected from (a) ethylene, (b) propylene (c) mixtures of ethylene and propylene or (d) mixtures of (a), (b) or (c) with one or more other alpha-olefins, comprising polymerising said olefin monomer(s) under polymerisation conditions in the presence of a supported catalyst system according to claim 1.

11. A process for the polymerisation of ethylene or the copolymerisation of ethylene and an alpha-olefin having from 3 to 10 carbon atoms, comprising polymerising said ethylene or ethylene and an alpha-olefin under polymerisation conditions in the presence of a supported catalyst system according to claim 1.

12. A process according to claim 10 wherein the alpha-olefins are selected from 1-butene, 1-hexene, 4-methyl-1-pentene or 1-octene.

13. A process according to claim 10 which is carried out in the gas phase.

14. A supported catalyst system suitable for the polymerisation of olefins comprising
(a) a transition metal compound,
(b) an activator represented by the formula:

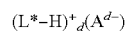

wherein
- L* is a neutral Lewis base
- $(L^*-H)^+_d$ is a Bronsted acid
- $A^{d-}$ is a non-coordinating compatible anion of a Group IIIA metal or metalloid having a charge of d⁻, and
- d is an integer from 1 to 3, and (c) a support material comprising an inorganic metal oxide, inorganic metal halide or polymeric material or mixtures thereof, wherein the support material has been pretreated with an $SO_4$ containing compound.

15. A supported catalyst system according to claim 14 wherein the support material is silica.

16. A supported catalyst system according to claim 14 or 15 wherein the transition metal compound is a metallocene.

17. A supported catalyst system according to claim 16 wherein the metallocene has the formula:

wherein Cp is a single cyclopentadienyl or substituted cyclopentadienyl group optionally covalently bonded to M through a substituent, M is a Group VIA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, and siloxyalkyl having up to 20 non-hydrogen atoms or neutral Lewis base ligands having up to 20 non-hydrogen atoms or optionally one X together with Cp forms a metallocycle with M and n is dependent upon the valency of the metal.

18. A supported catalyst system according to claim 16 wherein the metallocene is represented by the general formula:

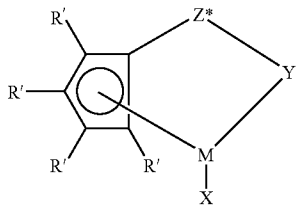

wherein:
R' each occurrence is independently selected from hydrogen, hydrocarbyl, silyl, germyl, halo, cyano, or combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^5$ bonded diene group having up to 30 non-hydrogen atoms, which forms a π-complex with M;

Y is —O—, —S—, —NR*—, —PR*—,

M is titanium or zirconium in the +2 formal oxidation state;

Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, or combinations thereof, said R* having up to 10 non-hydrogen atoms, and optionally, two R* groups from Z* (when R* is not hydrogen), or an R* group from Z* and an R* group from Y form a ring system.

19. A supported catalyst composition according to claim 14 wherein the anion comprises a boron metal.

20. A supported catalyst system according to claim 14 wherein the activator comprises a cation and an anion wherein the anion has at least one substituent comprising a moiety having an active hydrogen.

21. A supported catalyst system according to claim 14 wherein the SO$_4$ containing compound is a transition metal sulphate.

22. A supported catalyst system according to claim 21 wherein the transition metal sulphate is a sulphate of iron or copper.

23. A supported catalyst system according to claim 14 wherein the SO$_4$ containing compound is ammonium sulphate or sulphuric acid.

24. A process for the polymerisation of olefin monomer(s) selected from (a) ethylene, (b) propylene (c) mixtures of ethylene and propylene or (d) mixtures of (a), (b) or (c) with one or more other alpha-olefins, comprisinp polymerising said olefin monomer(s) under polymerisation conditions in the presence of a supported catalyst system according to claim 14.

25. A process for the polymerisation of ethylene or the copolymerisation of ethylene and an alpha-olefin having from 3 to 10 carbon atoms, comprisinp polymerising said ethylene or ethylene and an aipha-olefin under polymerisation conditions in the presence of a supported catalyst system according to claim 14.

26. A process according to claim 24 wherein the alpha-olefins are selected from 1-butene, 1-hexene, 4-methyl-1-pentene or 1-octene.

27. A process according to claim 24 which is carried out in the gas phase.

* * * * *